May 5, 1931. P. F. HOLMGREN 1,803,432
CRANK SHAFT
Filed Jan. 13, 1930
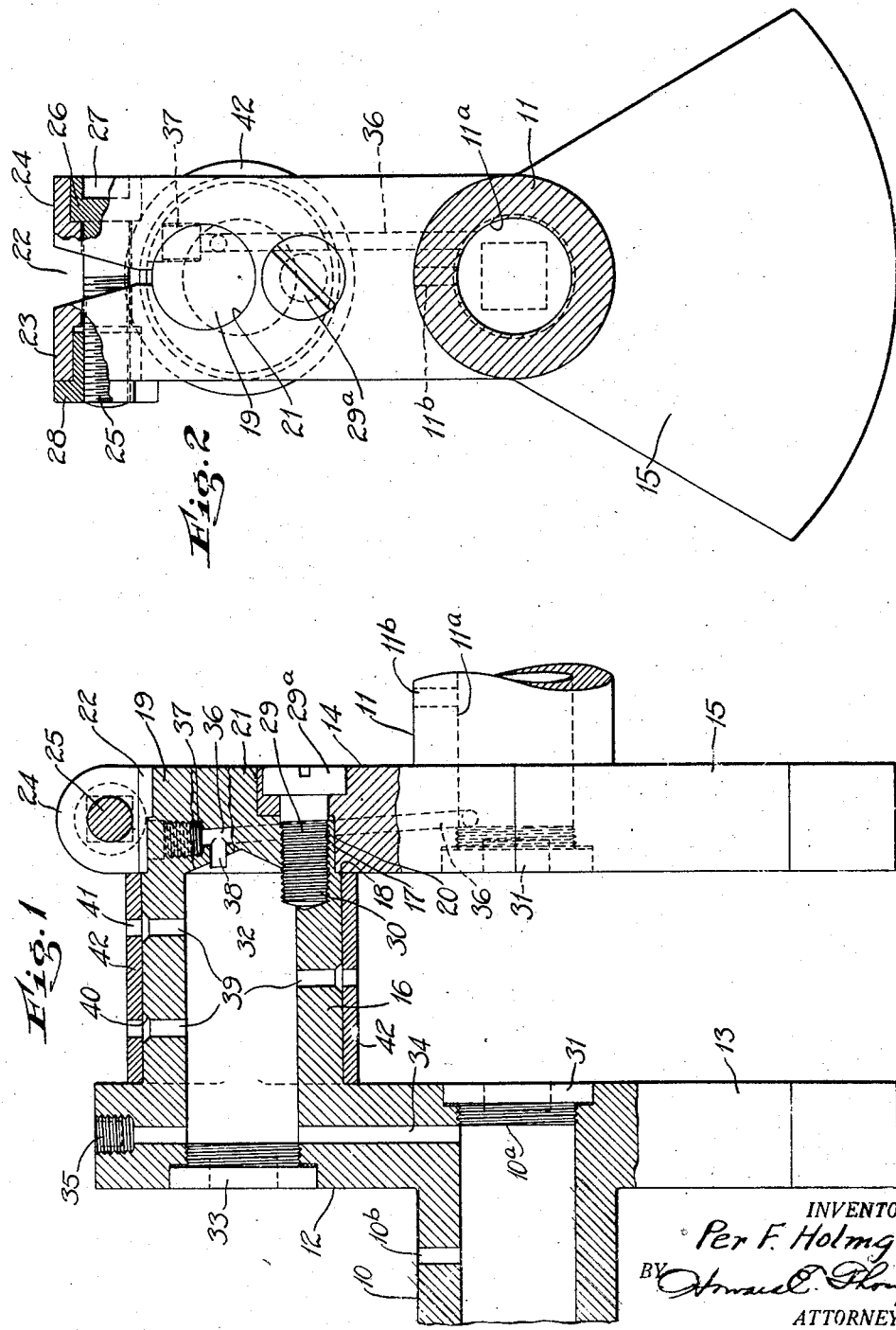
INVENTOR.
Per F. Holmgren
BY
ATTORNEYS.

Patented May 5, 1931

1,803,432

UNITED STATES PATENT OFFICE

PER F. HOLMGREN, OF BROOKLYN, NEW YORK

CRANK SHAFT

Application filed January 13, 1930. Serial No. 420,513.

This invention relates to crank shafts for use in engines of various kinds and classes as well as in pumps, compressors and the like, and particularly to what may be termed a built up crank shaft; and the object of the invention is to provide a device of the class specified wherein the positioning of the crank pin with respect to the shaft may be accurately formed whereby the alinement is rendered as near perfect as possible, and further whereby the exposed surfaces may be accurately machined in the accomplishment of this result and especially in the alinement of one crank shaft with another part in a built-up crank shaft thus obviating the present difficulties which are experienced by the use of keys of various kinds and classes; a further object being to provide a simple and yet positive means of alining the crank pin with respect to the several arms of a crank shaft in a built up or sectional shaft construction with means for retaining the separate parts in assembled position and further with means for lubricating the bearing surfaces of the device; and with these and other objects in view, the invention consists in a crank shaft of the class and for the purpose specified which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a side and sectional view of one form of crank shaft made according to my invention; and, Fig. 2 is a sectional and side view of the shaft shown in Fig. 1.

In the construction shown, 10 and 11 represent the spaced parts of a carnk shaft of any kind or class joined by the crank structure, the particular type of crank shaft shown being designed primarily for use in aeroplane engines, it being understood however, that my invention is applicable to crank shafts of engines of any kind or class or to other types of apparatus.

The shaft 10 includes a crank arm 12 extending radially with respect to one side of the shaft and an oppositely disposed counter weight 13. The shaft 11 has a similar radial arm 14 and an oppositely disposed counter weight 15. The arm 12 has an integral crank pin 16 extending from the outer surface thereof, the inner end of said pin being reduced slightly to form an annular bearing and alinement portion 17 having a shoulder 18 adapted to abut the adjacent face of the arm 14. Arranged eccentrically to the axis of the pin 16 is a small key pin or member 19 constituting an integral part of the pin 16 and projecting beyond the portion 17 as clearly seen in Fig. 1 of the drawings.

The arm 14 is provided with a large bore 20 which is formed to snugly receive the portion 17 of the pin 16 and is provided with a smaller bore 21 to snugly receive the pin 19, the latter opening through the inner face of the arm 14 whereas the bore 20 opens through the outer face of said arm. Both of these bores open through the top split portion 22 of the arm 14, the separate members 23 and 24 formed by the split 22 being clamped together by a bolt or screw 25, the head 26 of which has an angular socket 27 and the threaded end of said bolt being adapted to engage a flanged nut 28 arranged in the part 23. This construction serves to securely retain the pin 19 as well as the portion 17 of the crank pin 16 in firm engagement with the arm 14, the pin 19 preventing rotation of the pin 16 with respect to said part.

In securing the parts together, a screw 29 is employed. This screw is in threaded engagement with a threaded bore 30 formed in the pin 16 as well as the portion 17 thereof, and the head 29a of the screw is countersunk in the arm 14. In this connection, it will also be noted that the head 26 of the bolt 25 is countersunk in the part 24 and the major portion of the nut 28 is arranged within the part 23.

In the particular type of crank shaft shown which as before stated is intended for use in aeroplane engines and especially engines wherein a plurality of cylinders are arranged circumferentially with respect to one crank of a crank shaft, it is essential to pass the lubricating oil through the crank shaft and for this reason, the shaft 10 has a bore 10a forming an oil chamber through which oil may be passed to its wearing surface through bores 10b and in like manner, the shaft 11 has an oil chamber 11a and feed bores 11b, the bores of chambers 10a—11a being closed by plugs 31 countersunk in the adjacent faces of said shafts.

The pin 16 has a bore 32 drilled from the inner surface of the arm 12 to a point adjacent the portion 17 of said pin, the outer end of the bore being closed by a plug 33. This bore forms an oil reservoir which is placed in communication with the reservoir or chamber 10a through a bore 34 drilled from the outer end of the arm 12 inwardly, said outer end being closed by a plug 35. A similar bore 36 is drilled through the arm 14 as well as through the portions 17 of the pin 16, the outer end of the bore 36 being closed by a plug 37 and a small bore 38 places the bore 32 in communication with the bore 36 so that oil may pass from the chamber 10a of one crank shaft to the chamber 11a of the other crank shaft and through the crank pin, the latter having ports 39 for transmitting the oil to the bearing surface of the pin or two angular grooves 40 formed therein for supply to a bushing 42, the latter having ports 41 for supplying lubricating oil to the bearing surface of the connecting rod or rods employed.

From the foregoing, it will be apparent that by manufacturing crank shaft parts 10 and 11 including the crank arms 12 and 14 separately in the manner described, the accurate machining of the pin 16 with respect to the axis of the shaft 10 as well as the machining of the portion 17 and pin 19 and the arrangement of the axis of the key pin 19 with respect to the axis of the pin 16 may be performed in a positive and accurate manner, and likewise bores 20 and 21 may be positively and accurately formed in the arm 14 so that these bores may be interchanged one with respect to the other without the necessity of fitting, with the assurance that the shafts 10 and 11 will be maintained in proper alinement and that the pin 16 will be accurately spaced with respect to said shafts and alined therewith. At the same time, a very strong and durable key is provided for keying the pin 16 against rotation with respect to arm 14.

It will also be understood that a comparatively large bearing surface is formed between the portion 17 of the pin and the arm 14 including the surface provided by the pin 19, thus producing a strong and durable construction and one which will materially simplify and reduce the manufacturing costs and the labor involved in assembling crank shafts of the built up type.

It will be understood that while I have shown certain details of construction for carrying my invention into effect and have referred to certain uses of the invention, that I am not necessarily limited in these respects and various changes in and modifications of the construction herein shown and described may be made within the scope of the appended claims without departing from the spirit of my invention or sacrificing its advantages.

Having fully described my invention, what I claim as new and desire to secure by Letters Patent, is:

1. A crank shaft of the class described comprising two shaft parts, each of said parts having radially extending integral arms arranged on adjacent ends thereof, one of said arms including an integral crank pin, the free end of which is of reduced size and the other arm having a socket in which the reduced end of said pin is adapted to seat, a key member projecting from the reduced end of said pin and arranged eccentric to the axis thereof for keying the pin against movement with respect to the second named arm, said socket including an eccentric portion to receive said key member, and means for securing the pin to said arm.

2. A crank shaft of the class described comprising two shaft parts, each of said parts having radially extending integral arms arranged on adjacent ends thereof, one of said arms including an integral crank pin, the free end of which is of reduced size and the other arm having a socket in which the reduced end of said pin is adapted to seat, a key member projecting from the reduced end of said pin and arranged eccentric to the axis thereof for keying the pin against movement with respect to the second named arm, said socket including an eccentric portion to receive said key member, means for securing the pin to said arm, and said means consisting of a screw entering a threaded bore arranged within the boundary of the reduced end of said pin for drawing the abutting surfaces of said pin and arm together.

3. A crank shaft of the class described comprising two shaft parts, each of said parts having radially extending integral arms arranged on adjacent ends thereof, one of said arms including an integral crank pin, the free end of which is of reduced size and the other arm having a socket in which the reduced end of said pin is adapted to seat, a key member projecting from the reduced end of said pin and arranged eccentric to the axis thereof for keying the pin against movement with respect to the second named arm, said socket including an eccentric portion to receive said key member, means for securing the pin to said arm, said means consisting of a screw entering a threaded bore arranged within the boundary of the reduced end of said pin for drawing the abutting surfaces of said pin and arm together, and oil ports formed in said shafts, arms and pin opening outwardly through the bearing surface of said pin whereby oil may be transmitted from one shaft to the other and to said pin.

4. A crank shaft of the class described comprising two shaft parts, each of said parts having radially extending integral arms arranged on adjacent ends thereof, one of said arms including an integral crank pin, the free end of which is of reduced size and the other arm having a socket in which the reduced end of said pin is adapted to seat, a key member projecting from the reduced end of said pin and arranged eccentric to the axis thereof for keying the pin against movement with respect to the second named arm, said socket including an eccentric portion to receive said key member, means for securing the pin to said arm, said means consisting of a screw entering a threaded bore arranged within the boundary of the reduced end of said pin for drawing the abutting surface of said pin and arm together, the second named arm being split at its free end, said split opening into both sockets in said arm, and means for clamping the split portions of the arm to securely clamp the end of the crank pin and said key member within said sockets.

5. A crank shaft of the class described comprising two shaft parts, each part having a radially extending integral arm arranged on adjacent ends thereof, one of said arms having an integral crank pin and the other arm a socket receiving one end portion of said pin, the dimensions of the end portion of the pin entering said socket being within the circumferential boundaries of the pin proper and including a reduced eccentric key member projecting from the end of said pin and fitting a corresponding socket in the second named arm, and means disposed within the boundaries of said pin and coupled therewith and cooperating with the second named arm for securing the pin thereto.

In testimony that I claim the foregoing as my invention I have signed my name this 9th day of January, 1930.

PER F. HOLMGREN.